United States Patent
Shatov et al.

(10) Patent No.: US 11,379,561 B2
(45) Date of Patent: Jul. 5, 2022

(54) LICENSE USAGE MANAGEMENT (71) Applicant: AT&T Intellectual Property I, L.P., Atlanta, GA (US)

(72) Inventors: Alexander Shatov, Jamesburg, NJ (US); Christopher Rath, Hillsborough, NJ (US); John Murray, Denville, NJ (US); Michelle Martens, Freehold, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 369 days.

(21) Appl. No.: 16/512,169

(22) Filed: Jul. 15, 2019

(65) Prior Publication Data

US 2021/0019379 A1   Jan. 21, 2021

(51) Int. Cl.
  G06F 21/10   (2013.01)

(52) U.S. Cl.
  CPC .... G06F 21/105 (2013.01); *G06F 2221/0768* (2013.01)

(58) Field of Classification Search
  CPC .......... G06F 21/105; G06F 2221/0768; G06F 21/121; G06F 2221/2137; G06F 2221/2135; G06F 21/57; G06F 8/71; G06F 8/20; G06F 8/10; G06F 2221/2111; H04L 2463/101
  See application file for complete search history.

(56) References Cited

U.S. PATENT DOCUMENTS

| | | | | |
|---|---|---|---|---|
| 7,840,490 B1* | 11/2010 | Sellers | .................. | G06F 21/105 705/59 |
| 8,219,494 B1* | 7/2012 | Pride | ...................... | G06F 21/10 706/26 |
| 9,971,881 B1* | 5/2018 | Adam | .................... | G06F 21/604 |
| 10,649,630 B1* | 5/2020 | Vora | ...................... | G06F 3/0481 |
| 10,708,135 B1* | 7/2020 | Elliott, IV | ............. | G06F 9/5077 |
| 2003/0149670 A1* | 8/2003 | Cronce | .................. | G06F 21/121 705/59 |
| 2007/0011748 A1* | 1/2007 | Tiwari | .................. | G06F 21/105 726/26 |
| 2007/0198422 A1* | 8/2007 | Prahlad | .................. | G06F 21/10 705/52 |
| 2007/0226150 A1* | 9/2007 | Pietrzak | ................. | G06Q 30/02 705/59 |
| 2008/0313325 A1* | 12/2008 | Sullivan | .............. | H04L 41/0806 709/224 |
| 2009/0037337 A1* | 2/2009 | Baitalmal | .............. | G06Q 99/00 705/59 |
| 2009/0113397 A1* | 4/2009 | Wright, Sr. | ............ | G06Q 30/04 705/34 |

(Continued)

OTHER PUBLICATIONS

"License-Usage-Manager (LUM) architecture"; https://wiki.acumos. org/display/LM/License-Usage-Manager+%28LUM%29+architecture; Atlassian Confluence; accessed Dec. 9, 2019; 9 pages.

(Continued)

*Primary Examiner* — David Garcia Cervetti
(74) *Attorney, Agent, or Firm* — Guntin & Gust, PLC; Ralph Trementozzi (57) ABSTRACT

A method may include obtaining a state diagram of a software management system, wherein the software management system manages at least a first software and configuring a license usage management system based on the state diagram.

20 Claims, 7 Drawing Sheets

(56) References Cited

U.S. PATENT DOCUMENTS

| | | | | |
|---|---|---|---|---|
| 2009/0119779 A1* | | 5/2009 | Dean | G06F 21/128 717/174 |
| 2010/0122233 A1* | | 5/2010 | Rath | G06F 8/10 717/105 |
| 2011/0307885 A1* | | 12/2011 | Cushion | G06F 21/105 718/1 |
| 2012/0130911 A1* | | 5/2012 | Maclellan | G06Q 10/06 705/310 |
| 2012/0239660 A1* | | 9/2012 | Patel | G06F 16/2272 707/741 |
| 2012/0255025 A1* | | 10/2012 | Roshchin | G06F 21/121 726/26 |
| 2012/0304248 A1* | | 11/2012 | Watts | G06Q 30/06 726/1 |
| 2013/0010642 A1* | | 1/2013 | Ullas | H04L 63/0272 370/254 |
| 2013/0019002 A1* | | 1/2013 | Heileman | G06F 21/10 709/223 |
| 2013/0198856 A1* | | 8/2013 | Li | G06F 21/121 726/27 |
| 2014/0047506 A1* | | 2/2014 | Yabe | G06F 21/105 726/3 |
| 2014/0137261 A1* | | 5/2014 | Chen | G06F 21/105 726/26 |
| 2014/0283011 A1* | | 9/2014 | Orona | G16H 40/20 726/18 |
| 2014/0288996 A1* | | 9/2014 | Rence | G06Q 10/0635 705/7.28 |
| 2014/0379596 A1* | | 12/2014 | Pruss | G06F 21/105 705/318 |
| 2016/0125173 A1* | | 5/2016 | Ohzaki | G06F 21/105 726/29 |
| 2017/0109506 A1* | | 4/2017 | Shetty | G06F 16/13 |
| 2017/0270284 A1* | | 9/2017 | Sreesha | G06F 21/105 |
| 2017/0308685 A1* | | 10/2017 | Terry | G06F 21/105 |
| 2017/0353364 A1* | | 12/2017 | Kreiner | H04L 41/0823 |
| 2018/0293363 A1* | | 10/2018 | Asati | G06F 21/12 |
| 2018/0314809 A1* | | 11/2018 | Mintz | H04L 9/0637 |
| 2018/0321928 A1* | | 11/2018 | Borthakur | G06F 8/62 |
| 2018/0322599 A1* | | 11/2018 | Srivastava | G06Q 20/1235 |
| 2019/0102849 A1* | | 4/2019 | Bertot | G06F 3/0482 |
| 2019/0114397 A1* | | 4/2019 | Terry | H04L 63/20 |
| 2019/0129711 A1* | | 5/2019 | Stopa | G06F 8/71 |
| 2019/0141016 A1* | | 5/2019 | Borrill | H04L 9/0852 |
| 2019/0156445 A1* | | 5/2019 | Markham | G06Q 20/12 |
| 2019/0340271 A1* | | 11/2019 | Faulhaber | G06F 16/2455 |
| 2019/0340337 A1* | | 11/2019 | Faulhaber | G06F 21/105 |
| 2019/0340557 A1* | | 11/2019 | Faulhaber | G06F 16/2264 |
| 2020/0074048 A1* | | 3/2020 | Subramaniam | H04L 63/1425 |
| 2020/0089843 A1* | | 3/2020 | Flores | H04L 41/082 |
| 2020/0167444 A1* | | 5/2020 | Singh | G06F 8/65 |
| 2020/0201614 A1* | | 6/2020 | Wang | G06F 16/2365 |
| 2020/0348928 A1* | | 11/2020 | Vora | G06F 21/10 |
| 2020/0349238 A1* | | 11/2020 | Tyagi | G06F 16/22 |
| 2020/0374354 A1* | | 11/2020 | Kalandyk | H04L 43/08 |
| 2021/0349972 A1* | | 11/2021 | Poe | G06F 21/105 |

OTHER PUBLICATIONS

"Making Artificial Intelligence Accessible to Everyone"; https://www.acumos.org/; Acumos AI; accessed Dec. 9, 2019; 4 pages.

"Acumos AI Wiki"; https://wiki.acumos.org/; Atlassian Confluence; accessed Dec. 9, 2019; 2 pages.

* cited by examiner

LICENSE USAGE MANAGEMENT

BACKGROUND

Existing license management systems are designed as custom solutions that are hard to reuse. They only track the allocation of the asset to a user or to a company, and at best are tracking a specific predefined set of actions on the asset. This disclosure is directed to addressing issues in the existing technology.

SUMMARY

Existing license management systems, at best, track a specific predefined set of actions on the asset that is not a generic architecture and requires tight coupling of the license rules to the system that uses the asset. Disclosed herein is an architecture that may be based on an event model derived from a state diagram of a software asset lifecycle for the software management system.

In an example, an apparatus may include a processor and a memory coupled with the processor that effectuates operations. The operations may include obtaining a state diagram of a software management system, wherein the software management system manages at least a first software; and configuring a license usage management system based on the state diagram.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Conventional license management systems are designed as custom solutions that are difficult to reuse. Conventional license management systems may only track the allocation of the asset to a user or to a company, or track specific predefined set of actions on the asset that is specialized and requires tight coupling of the license rules to the system that uses the asset. Disclosed herein is an architecture that may widen the applicability of a license usage management system to a wide range of software management systems or hardware management systems. The architecture may be based on an event model derived from a state diagram of the software asset lifecycle for the software management system when the flow in the state of the software asset inside the software management system is interrupted to request the license usage entitlement from the license usage management (LUM) server.

Figure 1:
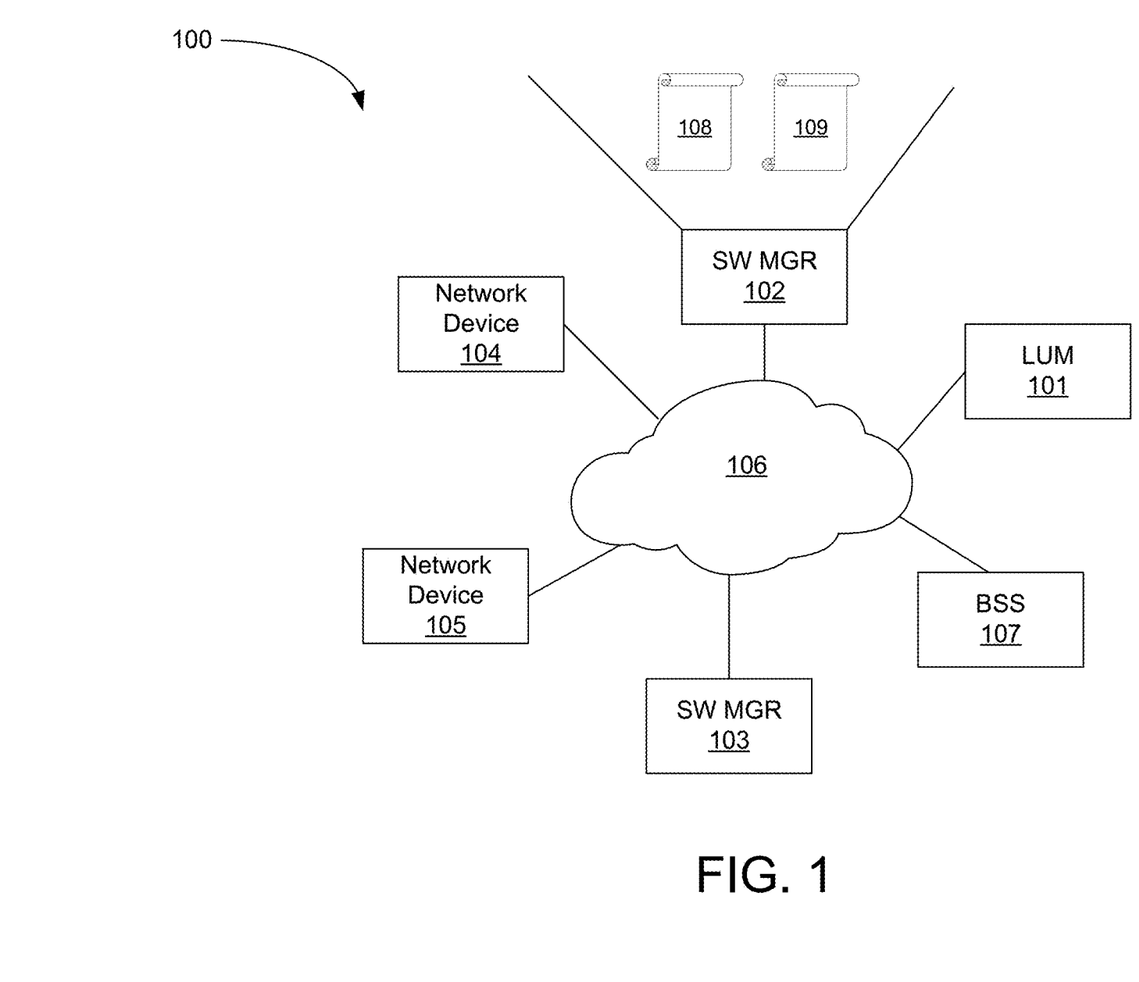
FIG. 1 illustrates an exemplary system that may implement license usage management (LUM).

FIG. 1 illustrates an exemplary system 100 that may implement license usage management (LUM) as disclosed herein. System 100 may include LUM server 101, software manager server 102 (also referred herein as a software management system or software manager), software manager server 103, network device 104, network device 105, or business support system (BSS) 107 that may be communicatively connected via network 106. Business support systems (BSS) are the components that a telecommunications service provider (or telco) uses to run its business operations towards customers. Together with operations support systems (OSS), they are used to support various end-to-end telecommunication services (e.g., telephone services). BSS and OSS usually have their own data and service responsibilities. The two systems together are often abbreviated OSS/BSS. LUM server 101 may manage the licenses or license usage of the assets that are managed by software manager 102 or software manager 103. LUM server 101 may manage the assignment and release of assets per license usage rules or the asset-entitlements from the right-to-use. LUM server 101 may include license related data (e.g., license, right-to-use, or license usage). LUM server 101 may track the history of usage of software and acquisition events along with the statistical metrics for the usage entitlement of the software. Assets as disclosed herein may be considered the software (e.g., software 108 for word processing or software 109 for network monitoring) that may be used on a device, such as network device 104 or network device 105.

With continued reference to FIG. 1, software manager 102 (or software manager 103) may be software that manages the download, cataloging, or deployment of software on devices. Software manager 102 may generate or assign identifiers (e.g., asset tags or public license identifiers) for software (also referred to herein as software assets or assets), among other things. Software manager 102 and software manager 103 may have different structures and usually may not be compatible software platforms. For example, software manger 102 may be Acumos while software manger 103 may be open network automation platform. There also may be business support system (BSS) 107 that obtains purchase orders and based on the purchase orders for software (for example) send a message to LUM 101 to get, add, update, or revoke entitlement.

Network device 104 or network device 105 may be any network device, such as a user equipment, router, server, switch, virtual machine, or the like. Network device 104 may periodically download software from or indicate deployment to software manager 102. Software 109 may be for physical or virtual machines. It is contemplated herein that one or more of the functions of the devices of system 100 may be combined or distributed across devices.

Figure 2:
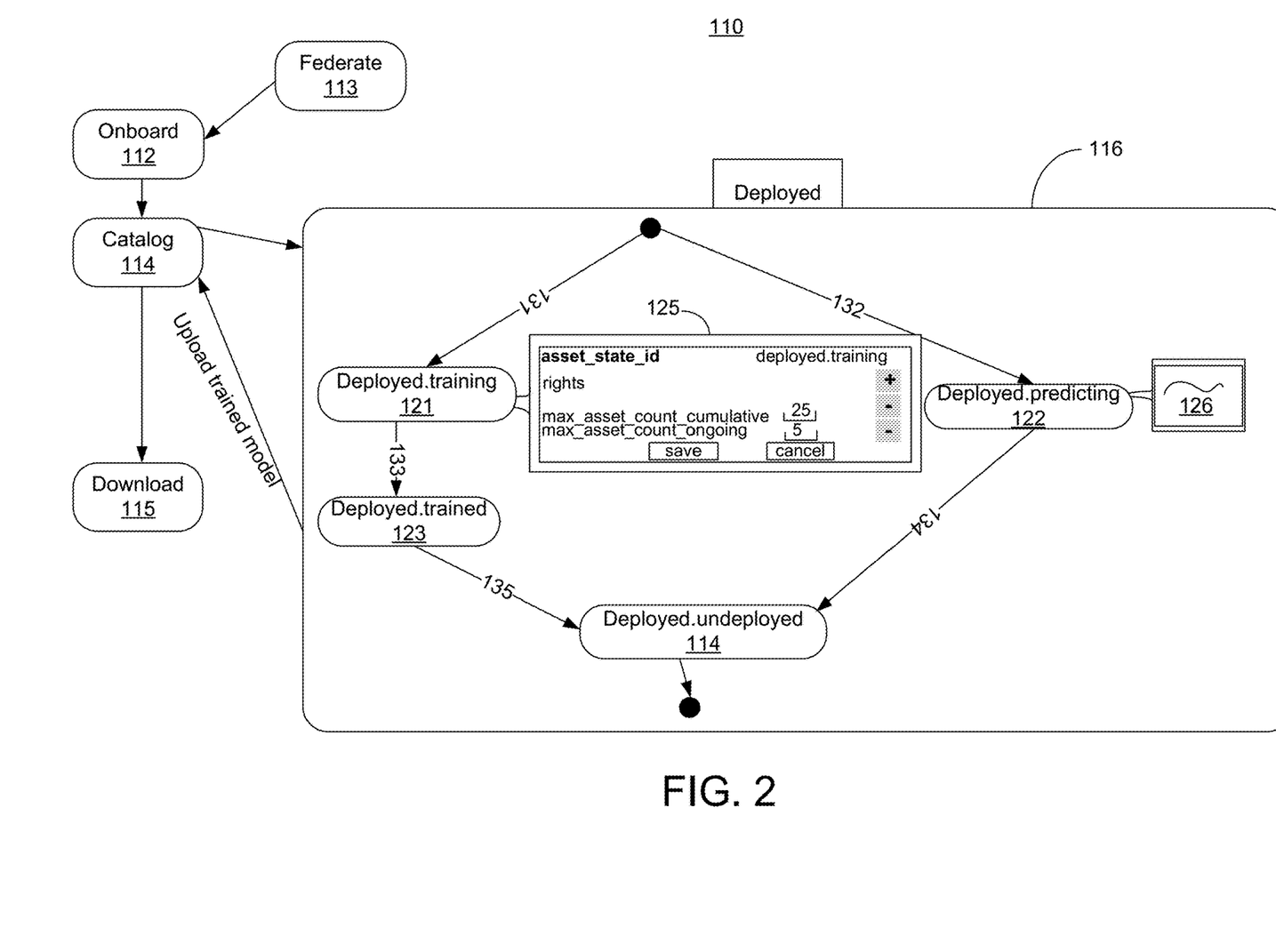
FIG. 2 illustrates an exemplary state diagram for software manger.

A system (e.g., software manager 102) that manages a software asset may explicitly or implicitly be defined by a state diagram for the software asset lifecycle. A state diagram may describe the behavior of a single object in response to a series of events in a system. The lifecycle of the asset may include multiple various states and transitions between the states that start at the asset creation and end at the asset destruction. FIG. 2 illustrates an exemplary state diagram 110 for software manger 102. State diagram 110 may include an onboard state 112, federate state 113, catalog state 114, download state 115, or deployed state 116. Each state of state diagram 110 may have additional states, transitions, or other information. Deployed state 116 may include states and transitions, such as Deployed.training state 121 (with deploy state-transition from catalog 131), Deployed.predicting state 122 (with deploy state-transition from catalog 132), Deployed.trained 123 (with train the model state-transition 135), or Deployed.undeployed 124 (with undeploy and release the asset state-transition 134, 135). A user interface may include pop-up blocks to enter licensed usage rules per asset state, such as pop-up block 125 or pop-up block 126.

Figure 3:
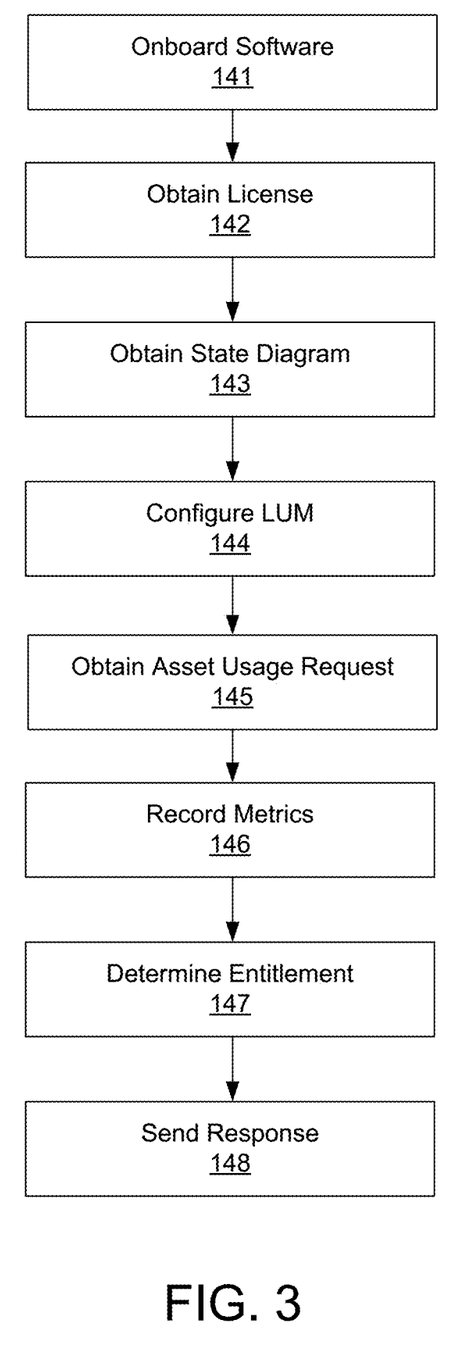
FIG. 3 illustrates an exemplary method flow for using the LUM.

This state diagram 110 may be abstracted from the specifics of the software management system (e.g., software manager 102) and ingested into the license usage management system 101. Attaching the license usage rules of the license usage management to the generic state diagram allows the disclosed LUM system 101 to be substantially agnostic of any particular software management system. FIG. 3 illustrates an exemplary method flow for using LUM 101 disclosed herein. At step 141, software 109 may be onboarded to software manager 102 (also referred herein as a software manager system). Onboarding may include downloading software 109 to software manager 102, assigning a license identifier for software 109, or adding a description of software 109 to a software catalog. At step 142, license information may be obtained by a license inventory of LUM 101. License information may include identifiers of software 109, type of the license that may specify whether the software is an open source or free software that does not require purchasing the right-to-use versus the commercial software that does require purchasing the right-to-use 109, asset usage rights of software 109, time based constraints for the software usage like expiration time 109, contract details of license supplier for software 109 that are in electronic form, or the like. License keys may be provided along with the right-to-use, rather than with the public license. At step 143, state diagram 110 (e.g., as shown in FIG. 2) may be obtained by LUM 101.

Figure 4:
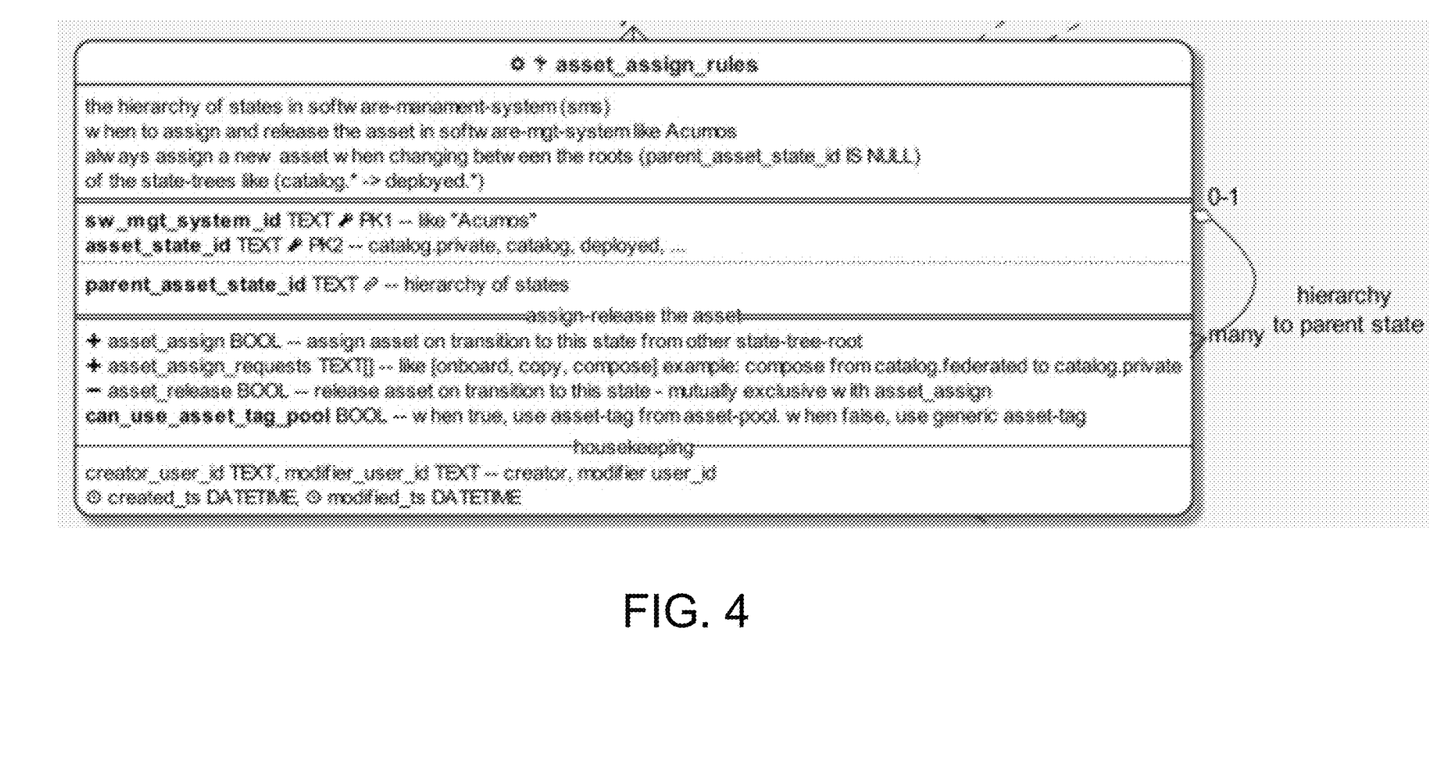
FIG. 4 illustrates an exemplary state diagram in table format.

State diagram 110 may also be in a table form as shown in FIG. 4 and further described below. There may be a root state and sub states. The whole hierarchy may be organized through an information identifier of the parent state. If any record in this table is selected, then the parent asset state ID may be investigated. And if it is provided, we can come back to the same table and file another record in which asset state ID may equal to parent asset state ID. It is significant that it is possible to go from the bottom child state to the very top root state and know virtually all the states, for example, are connected. So, the table can be a representation of the state diagram. The table of FIG. 4 does not have the state transitions. The states in the example shown in FIG. 4 may be sufficient, because of the limitation of the states in this example. See https://wiki.acumos.org/display/LM/License-Usage-Manager+%28LUM %29+architecture which is incorporated by reference in its entirety.

With continued reference to FIG. 3, at step 144, LUM 101 may be configured based on state diagram 110 of step 143 and license information of step 142. It is contemplated herein that step 143 and step 144 may be fed into LUM 101 once (e.g., initially) per software management system before the flow specified in FIG. 3. Therefore, there may be an initial flow of step 143 and step 144, and a separate (reoccurring) flow of step 141, step 142, step 145, step 136, step 147, and step 148.

At step 145, LUM 101 may obtain an asset usage request for software 109 based on the state of software manager 102.

At step 146, based on licensing metrics (also referred herein as metrics) and asset usage rules, there may be a determination of whether usage of software 109 is entitled. License metrics may include counter of assets, counter of entitlement denials, number of asset users, or any other value used by asset usage rule for comparison with the right-to-use value. Asset usage rules may include constraints for asset usage counts, asset user counts, date of asset usage expiration, time interval of asset usage is good for, or any limits for the asset usage like the number of CPUs, or country-based region where asset usage is allowed. At step 147, metrics associated with access usage of software 109 may be recorded, which may be based on step 146. At step 148, based on the determining of step 146, a response may be sent to software manager 102, in which the response may include an indication of whether the requested usage is entitled.

Figure 5:
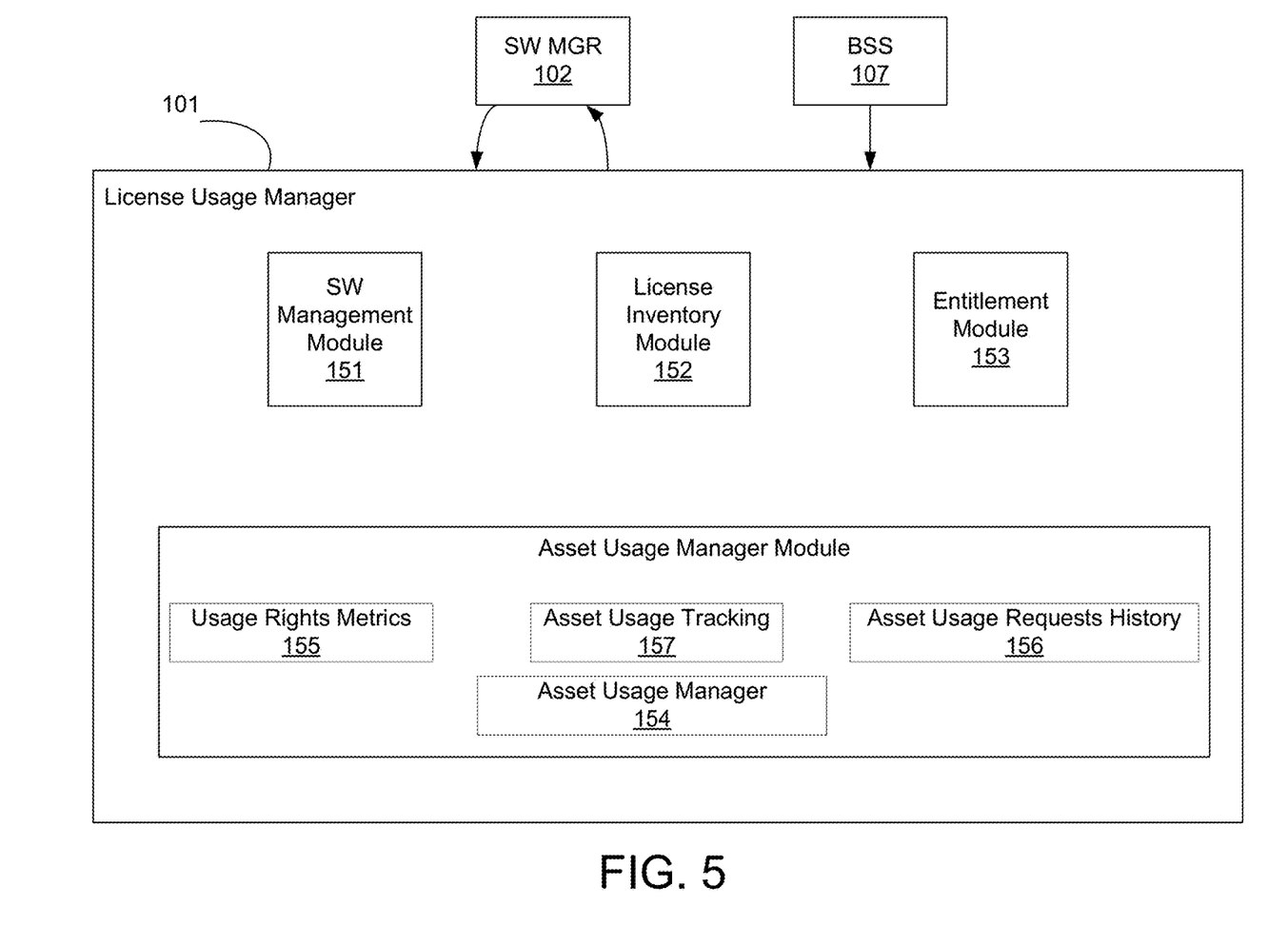
FIG. 5 illustrates an exemplary block diagram for license usage management.

FIG. 5 illustrates an exemplary block diagram for license usage management. Software manager 102 or BSS 107 may communicate with LUM server 101. Software manager 102 may send a message to get, add, update, or revoke a license. Software manager 102 may also request entitlement and receive a response for entitlement from LUM sever 101. BSS 107 may send a message to LUM server 101 to get, add, update, or revoke entitlement, which may be based on receiving or lack thereof of an electronic purchase order or the like. LUM server 101 may have multiple modules. There may be a software manger module 151, license inventory module 152, entitlement module 153 (e.g., list of right to use), or an asset usage manager (AUM) module 154. Software manager module 151 may include settings associated with software manager 102, a state diagram associated with software manager 102, and other information. License inventory module 152 may include a list of public licenses that may come along with the software, such as software 108 or software 109. Entitlement module 153 may include a collection rights to use the software.

With continued reference to FIG. 5, AUM module 154 may include its own subset of modules, such as usage rights metrics module 155, asset usage request history module 156, or asset usage tracking module 157. AUM module 154 may manage assets in multiple ways, such as assign assets or release assets to a network device or user based on the state. For example, an asset deployed for training on use of the software (e.g., Deployed.training 121) may be assigned as being in use and an in-use metric may be incremented. After the asset (e.g., software) is no longer being used for training, then it may be released and an in-use metric may be decremented for the asset.

For additional perspective, information associated with a state diagram is disclosed below. A state diagram may be considered a type of diagram used in computer science and related fields to describe the behavior of systems. State diagrams usually described a system composed of a reasonable abstraction of a finite number of states. State diagrams may be used to graphically represent finite state machines and may automatically be changed into tables, when needed, to interface with a system, such as LUM 101. A state diagram may be created by parsing software code for state information. A state diagram may illustrate performed actions in response to explicit events, which may be different from a flow chart. A flowchart does not necessarily need explicit events but rather transitions from node to node in its graph automatically upon completion of activities. Nodes of flowcharts may be considered edges in the induced graph of states. The reason is that each node in a flowchart may represent a program command. A program command is an action to be executed. So, it is not a state, but when applied to the program's state, it results in a transition to another state. You can compare a flowchart to an assembly line in manufacturing because the flowchart describes the progression of some task from beginning to end (e.g., transforming source code input into object code output by a compiler). A state diagram (which may be also referred herein as a state machine) generally has no notion of such a progression. The door state diagram, for example, is not in a more advanced stage when it is in the "closed" state, compared to being in the "opened" state; it simply reacts differently to the open/close events.

A state in a state diagram may be an efficient way of specifying a particular behavior, rather than a stage of processing. The efficiencies of a state diagram, which most software programs have, allows for use of a substantially agnostic license usage manager that may intake the state diagram of a software manager and execute operations with minimal updates. The disclosed system may allow for quick adaption to ever changing external software packages for managing software. It is contemplated herein that the disclosed subject matter associated with license usage management based on the state diagram may be applied to other systems outside of license usage management.

Any company that uses Acumos, ONAP, or the like may benefit from using this approach for License Usage Management. Acumos and ONAP are examples of software that may be considered different (e.g., significant lack of overlap which may be 25% or more not overlapping). The disclosed subject matter allows for a generic reusable solution for the license usage management system. The disclosed subject matter provides for compatibility with a significant number of software management systems or hardware management systems which in turn may reduce the cost for the software development of the license usage management system by eliminating the need to have or develop many specific solutions substantially from the ground up.

Methods, systems, and apparatuses, among other things, as described herein may provide for managing license usage. A method, system, computer readable storage medium, or apparatus may obtaining (e.g., receive) a state diagram of a software manager (e.g., software manager 102), wherein the software manager manages at least a first software; and based on the state diagram, configure a license usage management system (e.g., LUM 101). Configuring may include updating an asset usage rights template for a public license, updating default terms or conditions for the license that may be used in conjunction with a state of the state diagram, or assigning identifier which may be used in one of the multiple modules used herein, among other things. The method, system, computer readable storage medium, or apparatus may subsequently obtain licensing information associated with the first software; obtain a request for asset usage of the first software and the licensing information; and based on the request for asset usage of the first software, determine, by the license usage management system, whether usage of the first software is entitled. The method, system, computer readable storage medium, or apparatus may, based on the request for asset usage of the first software at the first time, the licensing information, and at least one license metric, determine, by the license usage management system, whether usage of the first software is entitled. The at least one license metric may include a period for use for the first software. The method, system, computer readable storage medium, or apparatus may, based on the request for asset usage of the first software at the first time, the licensing information, and at least one first license metric, determine, by the license usage management system, whether usage of the first software is entitled; and based on the usage of the software being entitled, increment the at least one first metric to become an at least one second metric. The method, system, computer readable storage medium, or apparatus may use the at least one second metric to determine whether usage of the first software is entitled for a subsequent request for asset usage of the first software at a second time. The licensing information may be from a BSS, wherein the BSS may convert a contract into electronic representation of a license for the first software. The at least one license metric may be incremented, decremented, assigned, or de-assigned based on the request for asset usage. The state diagram may be automatically changed from graphical representation into a table representation. The software manager system may include a licensing usage manager proxy that sends messages to the licensing usage manger system based on a state of the software manager system associated with the state diagram. The at least one metric may be associated with a type of device or location of the device (e.g., graphical GPS location). All combinations in this paragraph (including the removal or addition of steps) are contemplated in a manner that is consistent with the other portions of the detailed description.

Figure 6:
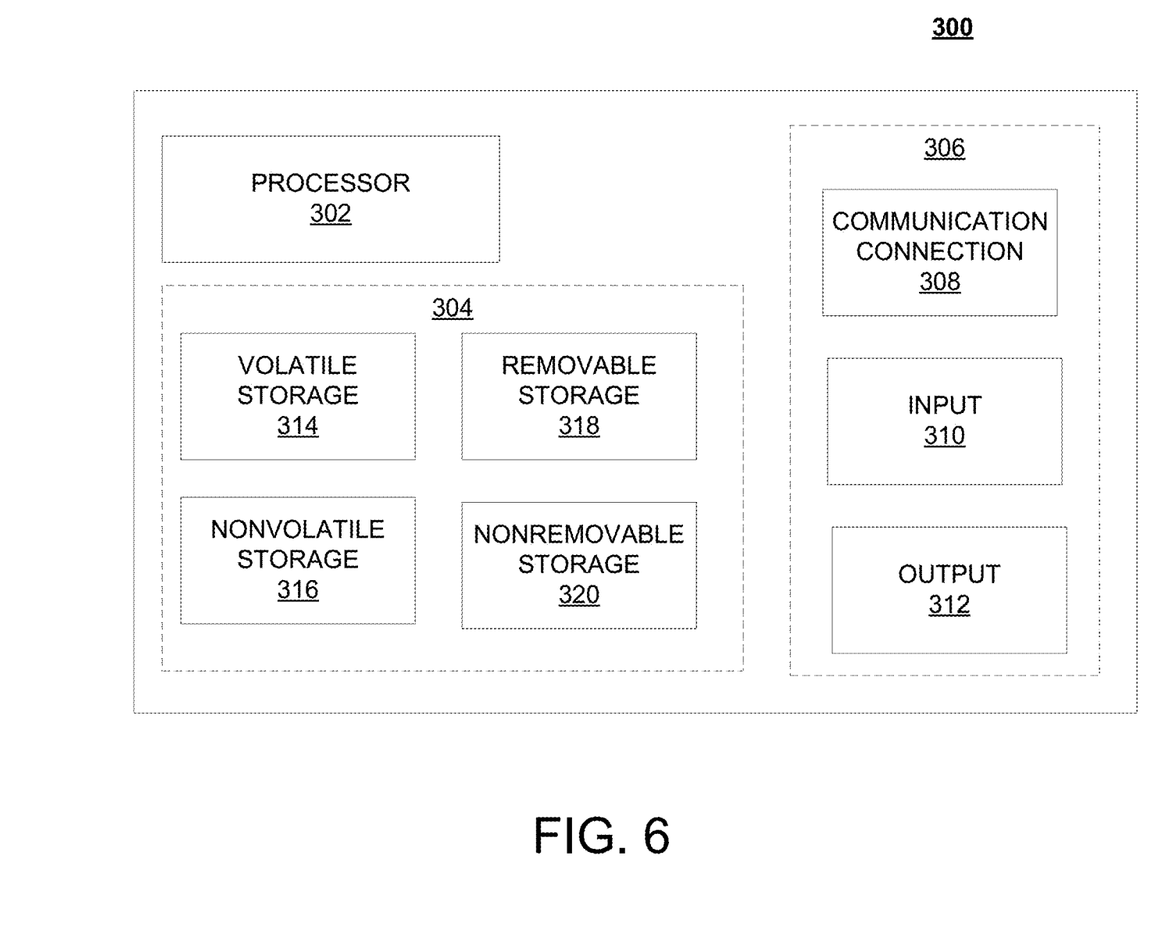
FIG. 6 illustrates a schematic of an exemplary network device.

FIG. 6 is a block diagram of network device 300 that may be connected to or comprise a component of system 100. Network device 300 may comprise hardware or a combination of hardware and software. The functionality to facilitate communication via a telecommunications network may reside in one or combination of network devices 300. Network device 300 depicted in FIG. 6 may represent or perform functionality of an appropriate network device 300, or combination of network devices 300, such as, for example, a component or various components of a cellular broadcast system wireless network, a processor, a server, a gateway, a node, or the like, or any appropriate combination thereof. It is emphasized that the block diagram depicted in FIG. 6 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 6) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for communication. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications or license usage management, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 7:
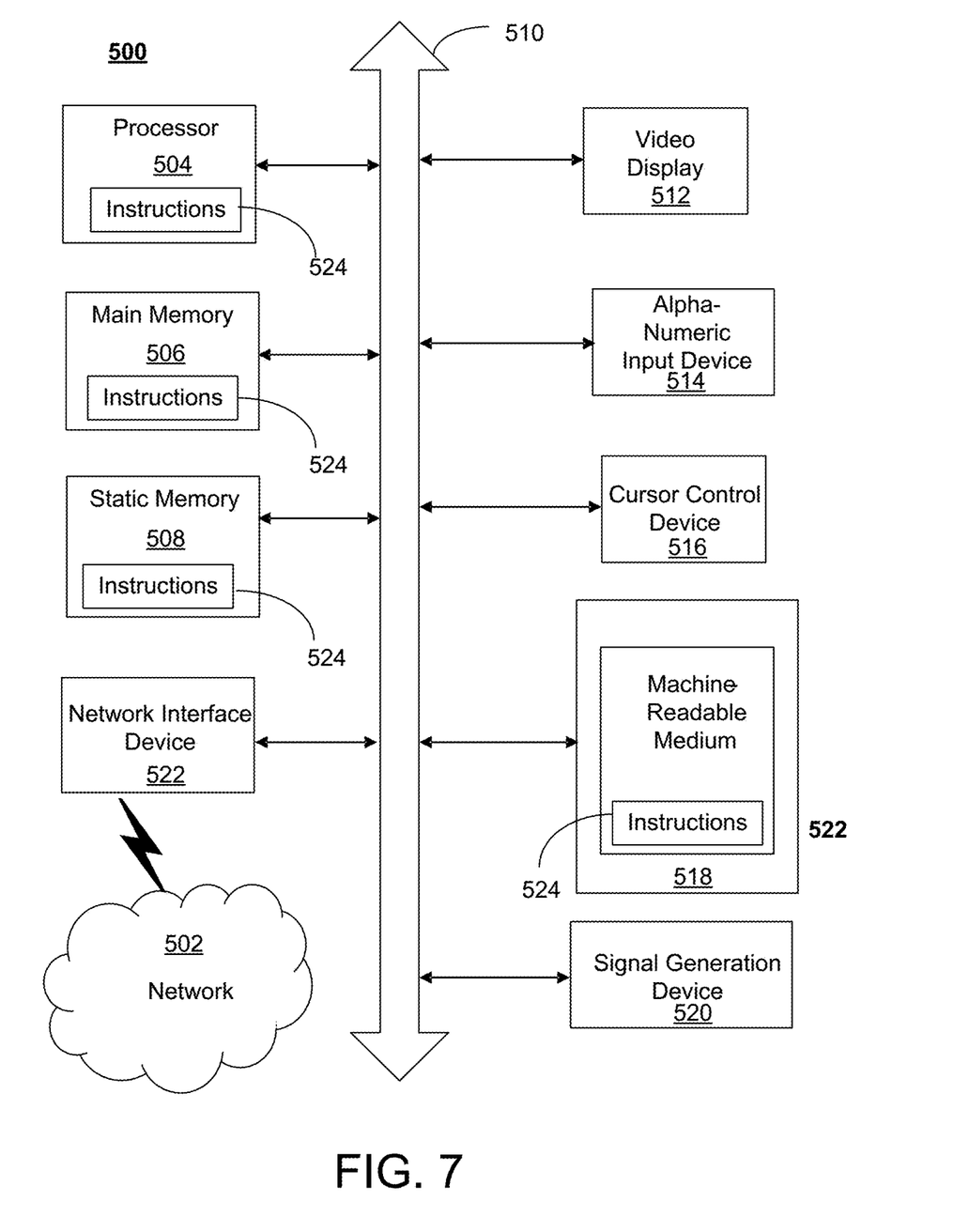
FIG. 7 illustrates an exemplary communication system that provides services over wireless networks.

FIG. 7 depicts an exemplary diagrammatic representation of a machine in the form of a computer system 500 within which a set of instructions, when executed, may cause the machine to perform any one or more of the methods described above. One or more instances of the machine can operate, for example, as processor 302, network device 104, network device 105, software manager 102, LUM 101, software manager 103, and other devices of FIG. 1. In some examples, the machine may be connected (e.g., using a network 106) to other machines. In a networked deployment, the machine may operate in the capacity of a server or a client user machine in a server-client user network environment, or as a peer machine in a peer-to-peer (or distributed) network environment. It is contemplated that the functions of some devices, such as software manager 102, network device 104, or LUM 101, may be combined into a singular device or distributed over multiple devices.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526 or software 109) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

While examples of a telecommunications system in which license usage management based on the state diagram can be processed and managed have been described in connection with various computing devices/processors, the underlying concepts may be applied to any computing device, processor, or system capable of facilitating license usage management. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for license usage management. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a license usage management as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device as described herein. When implemented on a general-purpose processor, the program code combines with the processor to provide a unique device that operates to invoke the functionality of a systems, such as LUM 101.

While a license usage management system has been described in connection with the various examples of the various figures, it is to be understood that other similar implementations may be used or modifications and additions may be made to the described examples of a license usage management system without deviating therefrom. For example, one skilled in the art will recognize that a license usage management system as described in the instant application may apply to any environment, whether wired or wireless, and may be applied to any number of such devices connected via a communications network and interacting across the network. Therefore, a license usage management system as described herein should not be limited to any single example, but rather should be construed in breadth and scope in accordance with the appended claims.

In describing preferred methods, systems, or apparatuses of the subject matter of the present disclosure—license usage management based on the state diagram—as illustrated in the Figures, specific terminology is employed for the sake of clarity. We may calculate the metrics and apply the metrics based on the state diagram and state transitions of a first software (e.g., Acumos). We may use state diagram in a generic manner, so if today it is a first software and tomorrow it is second software, we can just substitute the state diagram, but not replace generally anything else in the system. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. An apparatus comprising:
a processing system including a processor; and
a memory that stores executable instructions that, when executed by the processing system facilitate performance of operations, the operations comprising:
obtaining a state diagram of a software management system, wherein the software management system manages at least a first software, the state diagram describing a behavior of the first software in response to a series of events; and
configuring a license usage management system based on the state diagram.

2. The apparatus of claim 1, wherein the operations further comprise:
subsequently obtaining licensing information associated with the first software;
obtaining a request for asset usage of the first software and the licensing information; and
based on the request for asset usage of the first software, determining, by the license usage management system, whether usage of the first software is entitled.

3. The apparatus of claim 1, wherein the operations further comprise:
subsequently obtaining licensing information associated with the first software;
obtaining a request for asset usage of the first software; and
based on the request for asset usage of the first software at a first time, the licensing information, and at least one license metric, determining, by the license usage management system, whether usage of the first software is entitled.

4. The apparatus of claim 3, wherein the at least one license metric is incremented or decremented based on the request for asset usage.

5. The apparatus of claim 3, wherein the state diagram is automatically changed from graphical representation into a table representation.

6. The apparatus of claim 1, wherein the operations further comprise:
subsequently obtaining licensing information associated with the first software;
obtaining a request for asset usage of the first software; and
based on the request for asset usage of the first software at a first time, the licensing information, and at least one license metric, determining, by the license usage management system, whether usage of the first software is entitled, wherein the at least one license metric comprises a period for use for the first software.

7. The apparatus of claim 1, wherein the operations further comprise:
- subsequently obtaining licensing information associated with the first software;
- obtaining a request for asset usage of the first software;
- based on the request for asset usage of the first software at a first time, the licensing information, and at least one first license metric, determining, by the license usage management system, whether usage of the first software is entitled; and
- based on the usage of the first software being entitled, incrementing the at least one first metric to become an at least one second metric.

8. The apparatus of claim 1, wherein the operations further comprise:
- subsequently obtaining licensing information associated with the first software;
- obtaining a request for asset usage of the first software;
- based on the request for asset usage of the first software at a first time, the licensing information, and at least one first license metric, determining, by the license usage management system, whether usage of the first software is entitled;
- based on the usage of the first software being entitled, incrementing the at least one first metric to become an at least one second metric; and
- using the at least one second metric to determine whether usage of the first software is entitled for a subsequent request for asset usage of the first software at a second time.

9. The apparatus of claim 3, wherein the licensing information is from a server, and wherein the server converts a contract into electronic representation of a license for the first software.

10. The apparatus of claim 1, wherein the software management system comprises a licensing usage manager proxy that sends messages to the licensing usage manager system based on a state of the software management system associated with the state diagram.

11. A system comprising:
- a software management system; and
- a license usage management system communicatively connected with the software management system, wherein the license usage management system comprises:
  - a processing system including a processor; and
  - a memory that stores executable instructions that, when executed by the processing system, facilitate performance of operations, the operations comprising:
    - obtaining a state diagram of the software management system, wherein the software management system manages at least a first software, the state diagram describing a behavior of the first software in response to a series of events; and
    - configuring the license usage management system based on the state diagram.

12. The system of claim 11, wherein the operations further comprise:
- subsequently obtaining licensing information associated with the first software;
- obtaining a request for asset usage of the first software and the licensing information; and
- based on the request for asset usage of the first software, determining, by the license usage management system, whether usage of the first software is entitled.

13. The system of claim 11, wherein the operations further comprise:
- subsequently obtaining licensing information associated with the first software;
- obtaining a request for asset usage of the first software; and
- based on the request for asset usage of the first software at a first time, the licensing information, and at least one license metric, determining, by the license usage management system, whether usage of the first software is entitled.

14. The system of claim 13, wherein the licensing information is from a server, wherein the server converts a contract into electronic representation of a license for the first software.

15. The system of claim 11, wherein the software management system comprises a licensing usage manager proxy that sends messages to the licensing usage manager system based on a state of the software management system associated with the state diagram.

16. A non-transitory machine-readable storage medium that stores executable instructions that, when executed by a processing system including a processor facilitate performance of operations, the operations comprising:
- obtaining a state diagram of a software management system, wherein the software management system manages at least a first software, the state diagram describing a behavior of the first software in response to a series of events; and
- configuring a license usage management system based on the state diagram.

17. The non-transitory machine-readable storage medium of claim 16, wherein the operations further comprise:
- subsequently obtaining licensing information associated with the first software;
- obtaining a request for asset usage of the first software and the licensing information; and
- based on the request for asset usage of the first software, determining, by the license usage management system, whether usage of the first software is entitled.

18. The non-transitory machine-readable storage medium of claim 16, wherein the operations further comprise:
- subsequently obtaining licensing information associated with the first software;
- obtaining a request for asset usage of the first software; and
- based on the request for asset usage of the first software at a first time, the licensing information, and at least one license metric, determining, by the license usage management system, whether usage of the first software is entitled.

19. The non-transitory machine-readable storage medium of claim 18, wherein the licensing information is from a server, wherein the server converts a contract into electronic representation of a license for the first software.

20. The non-transitory machine-readable storage medium of claim 16, wherein the software management system comprises a licensing usage manager proxy that sends messages to the licensing usage manager system based on a state of the software management system associated with the state diagram.

* * * * *